United States Patent [19]
Howell

[11] Patent Number: 5,972,520
[45] Date of Patent: Oct. 26, 1999

[54] HIGH GLOSS HIGH IMPACT TPO COEXTRUSION AND METHOD OF MAKING

[75] Inventor: George Howell, Arlington, Tex.

[73] Assignee: UVTEC, Incorporated, Dallas, Tex.

[21] Appl. No.: 08/799,535

[22] Filed: Feb. 12, 1997

Related U.S. Application Data

[60] Provisional application No. 60/020,570, Jun. 26, 1996, and provisional application No. 60/021,404, Jul. 9, 1996.

[51] Int. Cl.$^6$ ................................................ B32B 27/08
[52] U.S. Cl. ....................... 428/516; 428/523; 525/240; 525/322
[58] Field of Search ..................... 428/516, 523; 525/240, 322

[56] References Cited

U.S. PATENT DOCUMENTS

| | | |
|---|---|---|
| 5,017,430 | 5/1991 | Chu et al. .............................. 428/353 |
| 5,091,236 | 2/1992 | Keller et al. .......................... 428/213 |
| 5,608,008 | 3/1997 | Miyata et al. ......................... 525/240 |
| 5,614,315 | 3/1997 | Kondo et al. .......................... 428/332 |
| 5,639,816 | 6/1997 | Yamaguchi et al. .................... 524/451 |

*Primary Examiner*—David W. Wu
*Attorney, Agent, or Firm*—Locke Liddell & Sapp LLP

[57] ABSTRACT

A high gloss, impact resistant material is made by coextruding a cap layer of a metallocene polyethylene and clarified random copolymer polypropylene onto a core layer. The coextrusion process is guided by a dual manifold die which reduces the interfacial instability of the melt streams as the cap layer is being applied. When thermoformed, the material retains its gloss and exhibits excellent low temperature impact resistance.

12 Claims, 3 Drawing Sheets

HIGH GLOSS HIGH IMPACT TPO COEXTRUSION AND METHOD OF MAKING

RELATED APPLICATIONS

This application is based on prior copending Provisional Application Nos. 60/020,570 and 60/021,404, filed Jun. 26, 1996 and Jul. 9, 1996, respectively.

TECHNICAL FIELD

The present invention relates to addition of up to about 15 percent of a metallocene polyethylene to a clarified random copolymer polypropylene to thereby dramatically improve the low temperature impact strength of the material without reducing gloss.

BACKGROUND OF THE INVENTION

Glossy or shiny surfaces have always been desirable for appearance parts made of plastic. Glossy parts, for example the finish on a new automobile, are aesthetically appealing. Plastic manufacturers are continually striving for higher gloss surfaces to make their plastic parts more appealing and to open new markets for their plastics.

This is especially important in the sheet extrusion/thermoforming market because most thermoforming tools are designed such that, in operation, the tool does not touch the appearance side of the sheet. In injection molding, the mold can be made to have a very high polish. By using high pressure to force the molten plastic up against the mold, a high gloss surface is achieved, even though the material itself is not inherently high gloss.

This, however, is not normally the case when a sheet of plastic is thermoformed. The thermoforming process typically consists of stretching sheet materials in all directions. Pressures are much lower in thermoforming and the tools are generally much-lower cost than injection molds and are not designed for aesthetics. Thus, the inherent gloss of the plastic material itself is the determining factor of the gloss of the finished part.

The gloss of a surface is determined by the amount of light that is scattered when light hits the surface of the object. This scattering is a function of the roughness of the surface. Any discrete particles on the surface, especially those large enough to scatter light, affect the gloss. This is the reason that most ordinary particulate fillers when compounded into plastic reduce the gloss dramatically. Ordinary rubber particles which are used to toughen plastics, such as that found in early formulations of acrylonitrile-butadiene-styrene (ABS) and in block copolymer polypropylene (PP), have the same effect. It was well-known in the art that ABS manufacturers had problems with gloss because they could not make small enough rubber particles. Subsequent technology allowed for the manufacture of rubber domains small enough so that ABS could be made with much higher gloss. Nevertheless, it has always been difficult for makers of crystalline or semicrystalline resins to make a high gloss resin because the crystals themselves act like particulates and cause the surface to be rough. High density polyethylene (HDPE) has had this problem, and so has PP to a lesser extent.

When making a sheet, it is possible to make a very high gloss surface by using highly polished chill rolls to cool the sheet. However, this high gloss finish disappears whenever the plastic is stretched and the inherent gloss of the plastic material shows though.

Prior inventions have concentrated on the high gloss aspect of molding materials. For example, in U.S. Pat. No. 4,849,045, a high gloss surface appearance on a polyvinyl chloride (PVC) molding is attempted by removably laminating a smooth film to the surface of the molding piece immediately after extrusion and then stripping off the film after the molding piece is cooled to room temperature. However, this process has limited commercial applicability since only a single gloss level may be achieved by the use of a particular film having a fixed surface finish. A different gloss appearance would require a different type of film. Other efforts have been made to produce a high gloss stretchable sheet material, but a number of these efforts have resulted in coating defects and insufficient uniformity to even undergo the stresses of thermoforming.

As the search goes on for high gloss materials, the impact strength of the materials has generated less interest. However, the thermoforming industry has recognized the need for a high gloss, high impact, material to use for exterior parts. Certain known materials are insufficient for several reasons, which are quite evident. ABS, high impact polystyrene (HIPS), and polycarbonate (PC) cannot be UV-stabilized easily, if at all. HDPE is not glossy. Acrylic coextruded over ABS is brittle, especially at low temperatures. Ordinary high impact copolymer PP is difficult to thermoform and is not glossy. Filled CPP, while easier to thermoform, is not glossy. Homopolymer PP is brittle.

The present invention addresses these deficiencies of the prior art.

BRIEF SUMMARY OF THE INVENTION

It is thus a primary object of the invention to provide a high gloss, high impact resistant thermoformed material.

It is thus another object to provide a method of improving the high gloss retention in a thermoformed material while strengthening its impact resistance.

It has been determined initially that if one could get the crystals small enough in PP, a high gloss could be attained. This is normally done with a clarifying agent, which nucleates the formation of crystals so they become small enough that they do not affect gloss. Such a product, however, is extremely brittle and unsuitable for outdoor use, even when coextruded with a high impact material.

The use of a clarified random copolymer PP improves the results. Random copolymer PP is reasonably high impact at room temperature, but at 0° F. it is still unacceptably brittle. The addition of any Block Copolymer PP, which would be the logical way of improving low temperature impact strength, results in a dramatic drop in gloss.

The present invention solves these deficiencies. The addition of up to about 15 percent metallocene PE to the random CPP results in only a slight drop in gloss and increases the low temperature impact strength tenfold. Thus, the invention involves the coextrusion of a cap layer of 15 percent metallocene PE in random copolymer PP and a core layer of a filled CPP. The cap layer is not brittle, it is high gloss, and can be easily UV-stabilized for use outdoors. The core layer provides thermoformability, rigidity, and excellent impact strength at both room temperature and 0° F. In addition, the coextruded sheet is relatively inexpensive. The coextrusion is performed in its preferred embodiment by the use of a dual manifold die which reduces the amount of interfacial stability in the coextrusion.

DETAILED DESCRIPTION OF THE PREFERRED EMBODIMENT

Figure 1:
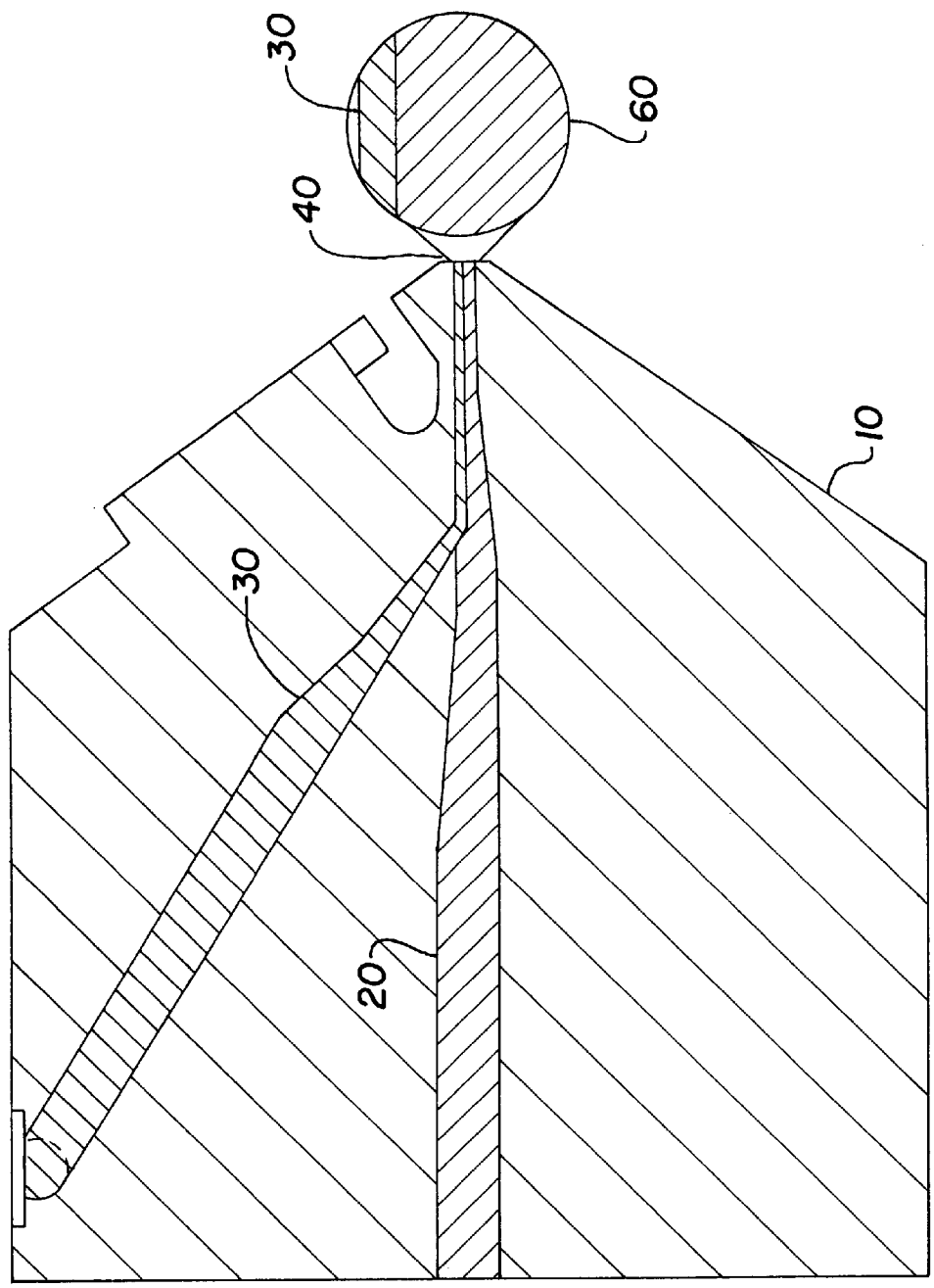
FIG. 1 is a view of a preferred method of manufacture involving a dual manifold die.
Figure 2:
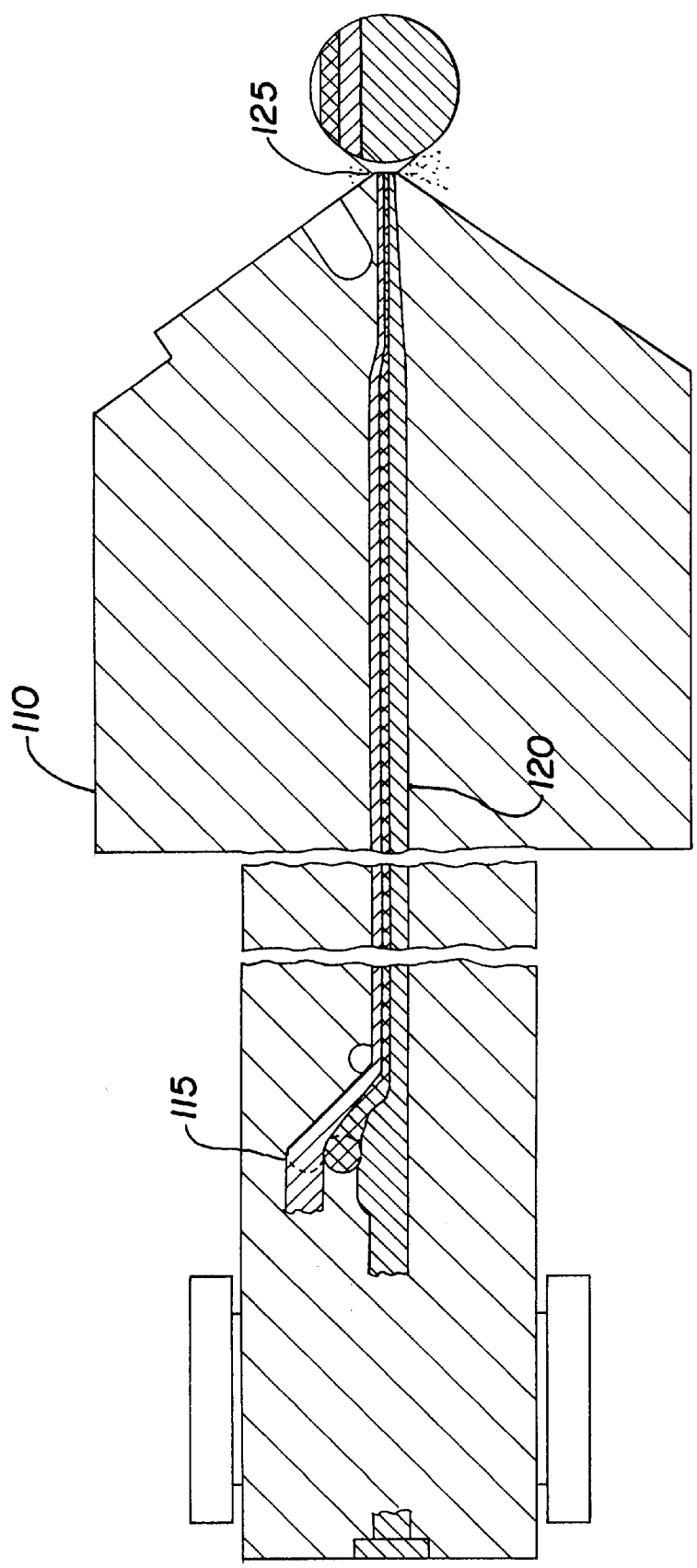
FIG. 2 is a view of a traditional feedblock/die set up.

Referring to FIG. 1, in the dual manifold die 10, two melt streams 20 and 30, one of metallocene polyethylene mixed with clarified random copolymer polypropylene and the other of filled CPP, are allowed to flow separately to adjacent ends of the die before merging just before the die lips 40 and then being applied as a cap layer 50 over a core layer 60. This operation has been found to reduce the amount of interfacial instability in the coextrusion and thus makes a more aesthetic part. Such instability is usually seen as a series of "waves" or imperfections in the finished product upon thermoforming. In the traditional set up 110, the materials 115 to be used in the coextrusion may flow together for a considerable distance, as much as 60", 120 before being coextruded 125. The teachings of the invention; however, can be practiced with this method as well.

The reduction of the amount of interfacial instability in the cap layer (which is provided with the die arrangement of FIG. 1) is of importance when considering that the cap layer is being stretched through the thermoforming process. Any resulting instability will provide a less uniform cap layer which can be further marred by the thermoforming process.

The invention is further illustrated by the following examples of the composition of the cap and core layers, A clarified random copolymer polypropylene is the base resin for the cap. The preferred resin is SR 256M from Montell; PP 7352KF from Quantum can also be used, as can other commercially-available materials. The metallocene PE may be either branched (from DuPont Dow Elastomers) or unbranched (from Exxon). Exxon Exact™ 4033, 4028 and 4041 and DuPont Dow XU 58381.00 showed advantageous results.

The core layer can be a commercial material such as Montell 3263E or similar material manufactured by UVTEC, Incorporated of Arlington, Tex. What is preferred is a fine particle size talc, such as MicroTuff 1000 from Barrets at the 25 percent by weight level, a commercial fractional meLt copolymer such as 7823 from Montell and an impact modifier such as Catalloy KS 351 from Montell.

Experimental

TABLE 1

Property Comparison of Resins

| Property | HPP[1] | RCPP[2] | Met RCPP[3] |
|---|---|---|---|
| Room Temp. Impact Strength | <8 | 160 | 210 |
| 0° F. Impact Strength | <2 | <4 | 50 |

TABLE 2

Property Comparison of Coextruded Sheet

| Property | HPP[1] over Filled CPP[4] | RCPP[2] over Filled CPP[4] | Met RCPP[3] over Filled CPP[4] |
|---|---|---|---|
| Room Temperature | | | |
| Impact Cap | 225 | 320+ | 320+ |
| Impact Core | 224 | 320+ | 320+ |
| 0° F. Impact | | | |
| Impact Cap | 100 | 175 | 320+ |
| Impact Core Formed Part | <8 | <8 | 320+ |

TABLE 2-continued

Property Comparison of Coextruded Sheet

| Property | HPP[1] over Filled CPP[4] | RCPP[2] over Filled CPP[4] | Met RCPP[3] over Filled CPP[4] |
|---|---|---|---|
| Gardner Gloss | | | |
| 60° angle | 87 | 85 | 78[5] |
| 20° angle | 63 | 57 | 55 |

[1]Homopolymer Polypropylene - Clarified.
[2]Clarified Random Copolymer Polypropylene
[3]Composition comprising clarified random copolymer PP and 15% Metallocene Polyethylene
[4]Copolymer Polypropylene
[5]While the level of gloss is slightly reduced, this level is commercially acceptable.
All Gloss Numbers are in % reflectance.
All Gloss readings were done with a Gardner Gloss meter on formed parts.
All Impact Numbers are in inch lbs. Maximum energy is 320 inch lbs. on the tester.
All Impacts were done using a Gardner Falling Dart Impact Tester using a 1/2" round dart in a 5/8" ring.

The significance of impacting the cap versus the core is that brittle materials fail more easily in tension than in compression. Impacting the core for example puts the cap in tension and hence the lower failure values.

Properties for the cap resins were measured on injection molded plaques 0.125" thick. The sheet in the above table was 200 mils thick with the cap thickness varying between 15 and 30 mils. The sheet was extruded on a commercial coextrusion line using a 6" 32:1L/D extruder for the core and a 4.5" 32:1L/D extruder for the cap. The feedblock was a conventional Dow design and the die was conventional 132" wide flex lip design with an angled restrictor bar.

TABLE 3

Formulations of Cap Resins %

| Material | HPP | RCPP | Met RCPP |
|---|---|---|---|
| Profax 6501 | 94.65 | — | — |
| Profax SR 256 M | — | 94.9 | 79.9 |
| Exact 4033 | — | — | 1.5 |
| UV Stabilizers | 0.7 | 0.7 | 0.7 |
| Antioxidants | 0.4 | 0.4 | 0.4 |
| Color Concentrate | 4 | 4 | 4 |
| Millad 3988 | 0.25 | — | — |

TABLE 4

Formulations of Core Resins %

| Material | UVTEC 4508-2 |
|---|---|
| Profax 7823 | 51 |
| KS 351 | 20 |
| Micro Tuff 1000 | 25 |
| Antioxidants | 0.5 |
| Zinc Stearate | 0.5 |
| Color | 3.0 |

High Gloss/Low Temperature Strength Test

Each formulation was based on a samples extruded into 0.110 inch thick sheets, 6 inches wide. The sheet was cut into 6 inch square blanks for thermoforming. The blanks were formed on a Formech 300X thermoforming machine. The tool was a cylinder 4.5 inches in diameter and 2 inches deep. The blanks were heated to a top surface temperature of 350 degrees Fahrenheit as measured by a IR pyrometer. The molten blank was pulled into a mold and cooled. After cooling, the flat bottom of the formed part was removed and a gloss reading taken. The gloss was measured at a 20 degree angle using a BYK Gardner micro-TRI-gloss reflectometer. This flat section would have the highest gloss reading due to the lessening of any imperfections in this section.

A similar sheet used on the gloss test was used in the Impact Test. The sheet was cut into two inch squares and was placed within a commercial refrigerator. The temperature was monitored to keep the temperature very close to zero degrees Fahrenheit.

The impact apparatus was a standard Gardner Falling Dart Impact Tester with a half inch diameter dart and a 5/8" diameter ring. The weight was 8 pounds and the instrument is marked in one inch increments. The method of use was the Bruceton Stairstep Method. At least 10 impacts were performed on each specimen.

Figure 3:
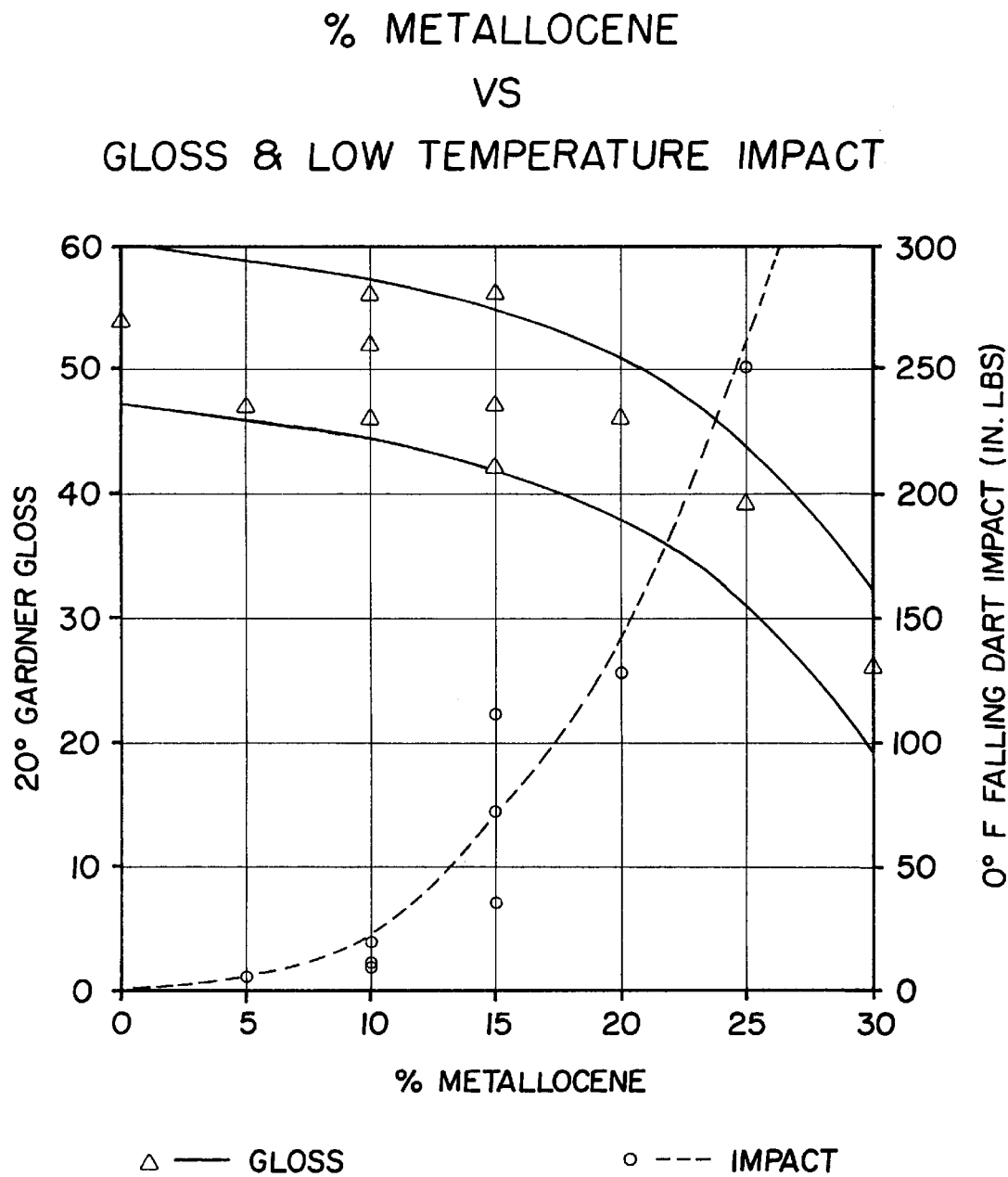
FIG. 3 is a graph of the relationship between gloss and low temperature impact strength for the material of the invention.

FIG. 3 depicts the results of the percentage test with these two variables. The data for FIG. 3 is presented in the following Table 5.

TABLE 5

| % Metallocene VS Gloss and Low Temperature Impact | | | | | | | |
|---|---|---|---|---|---|---|---|
| Property | 0% | 5% | 10% | 15% | 20% | 25% | 30% |
| 20° Gloss | 54 | 47 | 52 | 42 | 46 | 39 | 26 |
|  |  |  |  | 46 | 56 |  |  |
|  |  |  |  | 56 | 47 |  |  |
| FDI 0° F. | 0 | 6 | 12 | 36 | 128 | 250 | 320+ |
|  |  |  |  | 10 | 72 |  |  |
|  |  |  |  | 20 | 112 |  |  |

Note: Impact readings on commercial material (11% Metallocene) varied from 24 to 40 in.-lbs.
Gloss readings are % reflectance.
Falling Dart Impact readings are in in.-lbs.

As can be seen from FIG. 3 and Table 5, there is very little drop off in gloss up to the about fifteen (15) percent metallocene level. Past that level, the gloss begins to slightly diminish. In terms of low temperature impact strength, the strength increases exponentially once about fifteen (15) percent metallocene is added, and between ten (10) to fifteen (15) percent, the material has considerable (and acceptable) low temperature impact strength. In contrast, straight random copolymer has essentially no impact strength at 0° F.

It is, therefore, possible to use the novel method of making a material to obtain the exact gloss level required as well as determining a suitable impact strength. This is accomplished by adjusting the ratios of metallocene according to FIG. 3. One may also vary the temperature of the thermoforming process to modify the novel invention.

Based on the above formulations, a thin cap layer coextruded over a more impact resistance core layer with the above composition is preferred. It has a high gloss, high impact quality, is relatively inexpensive, and is easily stabilized for outdoor applications.

An alternative embodiment is to compound metallocene PE into the HPP formulation given in Table 3. As can be seen from Table 6 below, the properties are not as good as those using RCPP, but nevertheless the properties are an improvement over what was commercially available before the teachings contained herein.

TABLE 6

| % Metaflocene VS Gloss and Low Temperature Impact (HPP) | | | |
|---|---|---|---|
| Property | 0% | 5% | 25% |
| 20° Gloss | 52* | 51 | 39 |
| FDI 0° F. | <2 | 2 | 120 |

This data is done on laboratory samples as previously described.
Gloss readings are % reflectance.
Falling Dart Impact readings are in in.-lbs.
*Lab samples: Commercial samples would be expected to be higher. See Table 2.

It should be understood, of course, that while the invention herein shown and described constitutes a preferred embodiment and an alternative embodiment of the invention, it is not intended to illustrate all possible variations thereof. Alternative formulations may be created by one of ordinary skill in the art without departing from the spirit and scope of the invention described in the following claims.

Having thus described our preferred embodiment, what we desire to patent is set forth in the following claims:

I claim:

1. A high gloss thermoformed part made from material having coextruded cap and core layers, comprising:

(a) a cap layer comprising approximately 5–25% unbranched metallocene catalyzed polyethylene in a clarified, random copolymer polypropylene wherein the cap layer of the part exhibits a gloss of at least about 33% when measured on the 20 degree Gardner Gloss Scale;

(b) a core layer coextruded with the cap layer, the core layer being thicker than the cap layer; wherein the combined thickness of the coextruded core and cap layers being suitable for thermoforming.

2. The high gloss thermoformed part of claim 1 wherein the thermoformed part has a low temperature impact strength of at least about 5 inch pounds when impacting the core in a 0° F. Falling Dart Impact Test.

3. The high gloss thermoformed part of claim 1 wherein the core layer comprises polypropylene impact copolymer.

4. The high gloss thermoformed part of claim 3 wherein the polypropylene impact copolymer includes up to 50% filler material.

5. The high gloss thermoformed part of claim 4 wherein the filler material is coated talc.

6. The high gloss thermoformed part of claim 1 wherein the cap layer contains at least about 10% unbranched metalloccne catalyzed polyethylene and the low temperature impact strength is at least about 10 inch pounds when impacting the core in a 0° F. Falling Dart Impact Test.

7. A high gloss thermoformed part made from material having coextruded cap and core layers, comprising:

(a) a cap layer comprising approximately 5–25% unbranched metallocene catalyzed polyethylene in a clarified, random homopolymer polypropylene wherein the cap layer of the part exhibits a gloss of at least about 33% when measured on the 20 degree Gardner Gloss Scale;

(b) a core layer coextruded with the cap layer, the core layer being thicker than the cap layer; wherein the combined thickness of the coextruded core and cap layers being suitable for thermoforming.

8. The high gloss thermoformed part of claim 7 wherein the thermoformed part has a low temperature impact strength of at least about 2 inch pounds when impacting the core in a 0° F. Falling Dart Impact Test.

9. The high gloss thermoformed part of the claim 7 wherein the core layer comprises polypropylene impact copolymer.

10. The high gloss thermoformed part of claim 9 wherein the polypropylene impact copolymer includes up to 50% filter material.

11. The high gloss thermoformed part of claim 10 wherein the filler material is coated talc.

12. The high gloss thermoformed part of claim 7 wherein the cap layer contains at least about 10% unbranched metallocene catalyzed polyethylene and the low temperature impact strength is at least about 10 inch pounds when impacting the core in a 0° F. Falling Dart Impact Test.

* * * * *